United States Patent

Vickery

[15] 3,652,041
[45] Mar. 28, 1972

[54] REEFING DEVICE
[72] Inventor: Edwin D. Vickery, Tolland, Conn.
[73] Assignee: Pioneer Parachute Company, Inc., Manchester, Conn.
[22] Filed: Oct. 19, 1970
[21] Appl. No.: 81,938

[52] U.S. Cl. .................................................244/152
[51] Int. Cl. ...........................B64d 17/34, B64d 17/36
[58] Field of Search ...........................244/152, 149, 150

[56] References Cited

UNITED STATES PATENTS

| | | | |
|---|---|---|---|
| 2,403,832 | 7/1946 | Smith | 244/149 |
| 2,626,117 | 1/1953 | Heinrich | 244/152 |
| 3,173,637 | 3/1965 | Gross | 244/152 |

Primary Examiner—Milton Buchler
Assistant Examiner—Carl A. Rutledge
Attorney—Sperry and Zoda

[57] ABSTRACT

A reefing device for parachutes is provided with means for confining a parachute, or a portion thereof, together with control means operable in response to a combination of factors, namely the amount and duration of the forces applied to the confining means, for effecting the release thereof. The reefing device is therefore operable under widely varying conditions of loading and speed of travel of the parachute.

5 Claims, 3 Drawing Figures

PATENTED MAR 28 1972

3,652,041

INVENTOR
EDWIN D. VICKERY

BY Sperry and Zehe

ATTORNEYS 3,652,041

REEFING DEVICE

FIELD OF INVENTION

Reefing devices for parachutes have been employed heretofore for delaying the opening or deployment of parachutes so as to reduce the forces applied to the parachute, suspension lines and load, due to shock loading of the parachute. Such a delay in the opening of a parachute may also be desired to allow the parachute and load to descend more rapidly during the early stages of its fall while decelerating as it approaches the ground.

Those reefing devices heretofore employed have in some instances included confining means such as a break cord which when ruptured will release the parachute instantly or in a predetermined manner. However, if the force applied to the break cord is limited, the cord will not be broken and the parachute will not be released at all. On the other hand if the parachute is subjected to a sudden severe loading at an early stage of its descent, the break cord may be ruptured prematurely and the parachute or its load subjected to excessive forces causing damage thereto. Reefing cutters are sometimes used to cut a cord (reefing line). However, cutters are expensive and can be used only once.

Other reefing devices of the prior art have been provided with spring means for actuating releasing mechanism but such constructions are generally rather complicated and are dependent for their operation upon the characteristics of the spring means employed.

THE PRESENT INVENTION

In accordance with the present invention reefing means for parachutes are provided which are operable in response to a combination of factors, namely the amount and duration of the force applied to the releasing means. As a result the reefing device may be employed to release a parachute or a portion thereof, when subjected to limited loading at either low or high speeds, or to relatively heavy loading under such conditions.

For this purpose the parachute may be confined in a suitable manner by means of a cord, band or the like which will be stressed in response to the loading and speed of travel of the parachute. Releasing means are connected to the cord or band and provided with a dash pot or other fluid controlled device which is responsive to the amount and duration of the forces applied thereto for effecting the operation of the releasing means.

THE DRAWINGS

PREFERRED EMBODIMENT OF THE INVENTION

Figure 1:
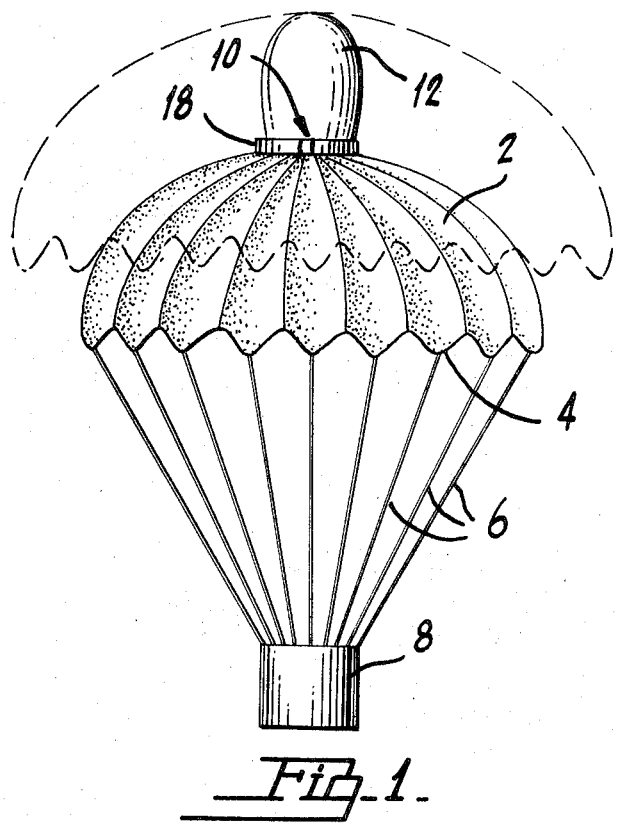
FIG. 1 is a diagrammatic side elevation of a typical parachute having a reefing device of the present invention applied thereto, and as seen during initial stages of deployment of the parachute.

In that form of the invention chosen for purposes of illustration in the drawing the reefing device is applied to a conventional type parachute having a canopy 2 provided with a skirt 4 from which suspension lines 6 extend downward to a load 8. Upon release of such a parachute from a carrier the skirt of the parachute initially expands somewhat as shown in FIG. 1. However, the reefing device 10 when applied to the parachute at a location between the skirt 4 and peak 12 of the canopy 2 encircles the canopy and serves to restrain the canopy so as to retard full deployment thereof until the reefing device has been disconnected or otherwise released to allow the upper portion of the canopy to be inflated to its full deployed condition for normal descent of the parachute and its load.

The general arrangement and usage of parachute reefing devices as thus illustrated is well known in the art as exemplified by U.S. Pat. to Smith No. 2,403,832 wherein the reefing device consists of a "break-strip". However, such reefing devices are found to function instantly, or not at all, depending upon the amount of force applied to the canopy restraining means after release of the parachute.

In accordance with the present invention the reefing device is provided with control means for effecting release of the parachute canopy in a predetermined manner dependent upon two different factors influencing its operation—namely the load carried by the parachute and the speed at which the parachute is travelling upon release from a carrier. Control means employing a cylinder and piston assembly are particularly suitable for this purpose provided they are arranged to respond to the forces applied to the restraining means after release of the parachute. Thus, when a parachute is released from a carrier travelling at a relatively high speed, the forces applied to the restraining means will be relatively great but will vary depending upon the weight or inertia of the load carried by the parachute. If the load is very heavy the piston will displace a fluid within the cylinder more rapidly than when a relatively light load is carried by the parachute. Conversely if the parachute is released from a carrier which is travelling relatively slowly the forces applied to the restraining means will be much less but they will still be generally proportional to the load carried by the parachute.

The forces required to actuate a cylinder and piston type control means must in any event be of at least some minimum duration with the result that instantaneous shocks or excessive forces to which the restraining means may be subjected will not result in undesired or premature release of the restraining means. As a result a predetermined delay and accurate control of the operation of the reefing device is assured under all conditions of usage.

Figure 3:
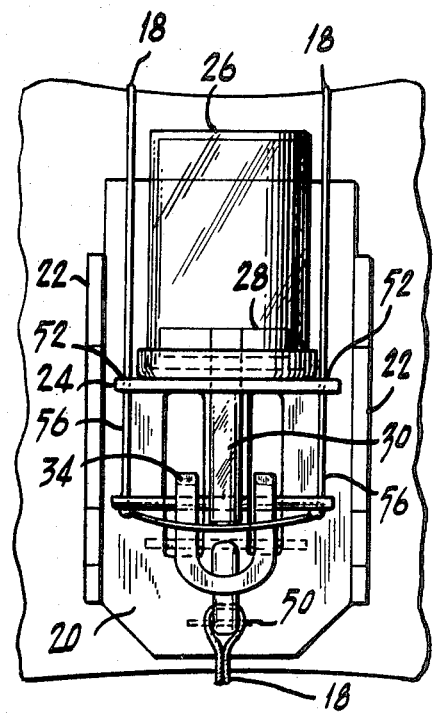
Figure 2:
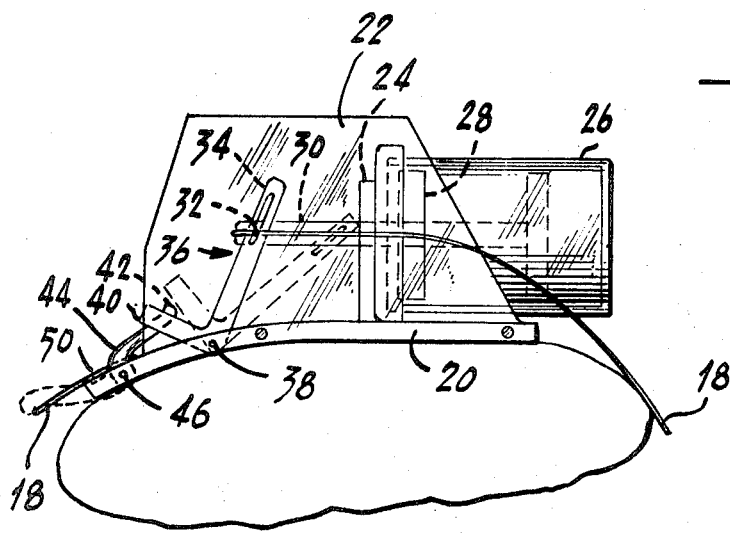
FIG. 2 is a horizontal sectional view of the assembly shown in FIG. 1, taken on the line 2—2 thereof and, FIG. 3 is a top plan view of the reefing device shown in FIG. 2.

For purposes of illustration the reefing device of the present invention includes restraining means 18, such as a cord or band which encircles the collapsed or folded canopy, together with control means for release of the restraining means such as the control means illustrated in FIGS. 2 and 3. As there shown, the restraining cord 18 encircles the canopy 2 at a suitable point between the skirt 4 and peak 12 of the canopy. A mounting plate 20 is secured to the canopy in position to be connected to the restraining cord 18 and may be provided with side plates 22 or other means which project upward at opposite sides of the plate 20 in position to protect the control means and prevent fouling of suspension lines or the canopy therewith. A cross member 24 is secured to the plate 20 and has a cylinder 26 mounted thereon in a position extending generally tangentially with respect to the canopy. A piston 28 is located within the cylinder 26 and has a piston rod 30 secured thereto and passing through the cross member 24. The free end of piston rod 30 is connected by a pin 32 to the upper ends 34 of a yoke 36 pivotally mounted at 38 on the mounting plate 20. The lower angularly disposed end 40 of the yoke 36 extends upward from the pivot 38 and serves as a retaining member for the free end 42 of a complementary retaining member 44. The retaining member 44 is pivotally mounted at 46 on the mounting plate 20 and is movable relative to the lower end 40 of yoke 36 to the dotted line releasing position of FIG. 2. Such release of retaining member 44 will occur upon movement of the yoke 36 to the dotted line position of FIG. 2 by predetermined movement of the piston 28.

The restraining cord 18, which extends about the confined parachute canopy 2 has the mid portion thereof looped about the pivoted retaining member 44 as shown at 50. The opposite ends 56 of the cord 18 extend through opening 52 in the cross member 24 and are secured to the pin 32 passing through the free end of piston rod 30 or to the upper ends 34 of yoke 36, or to both the pin and yoke, if desired.

The reefing devices thus provided may be applied to a parachute at one or more points thereon between the skirt and peak of the canopy and may be arranged in various different positions and in a manner to actuate various types of releasing means. In the construction shown release of the parachute from a carrier is followed by opening or deployment of the skirt portion of the canopy as shown in FIG. 1. This partial opening of the canopy applies tension to the cord 18 as the air entering the expanded skirt tends to urge the skirt farther open.

The tension applied to the restraining cord 18 causes the cord to function as an actuating device in that it serves to urge the piston 28 further into the cylinder 26 and to the right as shown in FIG. 2. As a result the yoke 36 will be tilted about its pivot 38. However, the fluid within the cylinder 26, which may be oil, air or any other selected fluid, must be displaced by the piston upon longitudinal movement of the piston within the cylinder. Such displacement may take place through a port in the piston or about the sides of a piston which fits loosely in the cylinder, but in any case will serve to retard the longitudinal movement of the piston and the pivotal movement of the yoke 36 and its angularly disposed retaining member 40.

Upon continued application of tension to the cord 18, and after predetermined longitudinal movement of the piston 28 with respect to the cylinder 26, the yoke 36 will be tilted sufficiently to cause the retaining member 40 to move out of engagement with the free end 42 of retaining member 44. The looped portion 50 of the cord 18 will then slip off the retaining member 44 whereupon the cord will be freely movable to release the confined portion of the canopy so as to allow the canopy to be further or fully deployed as indicated in dotted lines in FIG. 1.

The particular form and arrangement of the cylinder and piston assembly and the construction and application of the restraining means shown and described are typical of those which may be employed in the practice of the present invention. Furthermore, the type of parachute canopy shown and referred to are intended to be merely illustrative. Thus, for example when the present invention is used in controlling the deployment of gliding wing devices, such as that shown and described in U.S. Pat. No. 3,724,613, the location, arrangement and manner of application of the reefing device to the assembly may differ substantially from that herein cited by way of illustration.

I claim:

1. A reefing device for a parachute comprising restraining means engaging the parachute to delay deployment of the parachute after release of the parachute from a carrier, a cylinder and piston assembly connected to said restraining means and including a cylinder and piston which are relatively movable in response to forces applied to the restraining means after release of the parachute, two relatively movable retaining members engageable to hold said restraining means in restraining position with respect to the parachute, one of said retaining members being connected to an element of said cylinder and piston assembly and movable thereby out of engagement with the other of said retaining members to release said restraining means and permit deployment of the parachute.

2. A reefing device as defined in claim 1 wherein said restraining means encircles a portion of the canopy of the parachute.

3. A reefing device a defined in claim 1 wherein said restraining means has opposite end portions connected to said relatively movable retaining members.

4. A reefing device as defined in claim 1 wherein a mounting plate is carried by said restraining means, said cylinder and piston assembly are secured to said mounting plate, and one of said retaining members is movably mounted on said mounting plate and connected to said cylinder and piston assembly for movement thereby out of engagement with the other of said retaining members.

5. A reefing device for a parachute comprising means arranged to confine at least a portion of the parachute, control mechanism having spaced portions thereof connected to said confining means in position to be subjected to oppositely directed forces applied to said confining means, retaining members movable into and out of release position, and fluid displacing means connected to at least one of said spaced portions of the control mechanism and movable thereby to move said retaining members to said release position for releasing said confining means from said parachute.

* * * * *